(12) United States Patent
Sharkey et al.

(10) Patent No.: US 7,392,569 B2
(45) Date of Patent: Jul. 1, 2008

(54) CLAMPING APPARATUS AND METHOD

(75) Inventors: Brian Sharkey, Los Angeles, CA (US);
Ky Nguyen, Torrance, CA (US);
Christopher Quang, Pasadena, CA (US)

(73) Assignee: Transdigm, Inc., Cleveland, OH (US)

( * ) Notice: Subject to any disclaimer, the term of this patent is extended or adjusted under 35 U.S.C. 154(b) by 76 days.

(21) Appl. No.: 11/061,742

(22) Filed: Feb. 22, 2005

(65) Prior Publication Data

US 2005/0188509 A1 Sep. 1, 2005

Related U.S. Application Data

(60) Provisional application No. 60/545,946, filed on Feb. 20, 2004.

(51) Int. Cl.
*F16L 3/10* (2006.01)

(52) U.S. Cl. ...................... 24/16 R; 248/74.4

(58) Field of Classification Search ................ 248/68.1, 248/74.1, 74.4; 24/16 R
See application file for complete search history.

(56) References Cited

U.S. PATENT DOCUMENTS

| 2,396,925 | A | * | 3/1946 | Morehouse | 248/68.1 |
|---|---|---|---|---|---|
| 2,655,703 | A | * | 10/1953 | Flora | 24/16 R |
| 3,061,253 | A | * | 10/1962 | Keaton | 248/74.1 |
| 3,132,402 | A | * | 5/1964 | Joseph | 24/284 |
| 3,376,004 | A | * | 4/1968 | Goldman | 248/74.3 |
| 4,029,276 | A | * | 6/1977 | Zielie | 248/74.1 |
| 4,338,707 | A | * | 7/1982 | Byerly | 24/542 |
| 4,557,447 | A | * | 12/1985 | Combe | 248/74.1 |
| 4,730,800 | A | * | 3/1988 | Engman | 248/67 |
| 5,048,776 | A | * | 9/1991 | Weiss | 248/74.1 |
| 5,184,794 | A | * | 2/1993 | Saito | 248/68.1 |
| 5,377,940 | A | * | 1/1995 | Cabe et al. | 248/74.3 |
| 5,497,973 | A | * | 3/1996 | Balzen et al. | 248/551 |
| 6,732,982 | B1 | * | 5/2004 | Messinger | 248/74.1 |
| 6,892,990 | B2 | * | 5/2005 | Pisczak | 248/74.4 |
| 2003/0102412 | A1 | * | 6/2003 | Miescher | 248/62 |

* cited by examiner

*Primary Examiner*—Jack W. Lavinder
(74) *Attorney, Agent, or Firm*—Baker & Hostetler LLP

(57) ABSTRACT

A clamping method and apparatus including two halves of a clamp mated at a first end. The two halves are pivotally connected at a second end. The present invention is configured to permit the device to be repeatedly used without extended wear.

15 Claims, 4 Drawing Sheets

CLAMPING APPARATUS AND METHOD

CROSS-REFERENCE TO RELATED APPLICATIONS

This application claims priority to provisional U.S. patent application entitled, Universal Clamp, filed Feb. 20, 2004, having an application No. 60/545,946, the disclosure of which is hereby incorporated by reference in its entirety.

FIELD OF THE INVENTION

The present invention relates generally to retaining mechanisms. More particularly, the present invention relates to a clamp that includes a top and bottom portion such that these pieces are mated at one end and pivotally connected at another.

BACKGROUND OF THE INVENTION

There are many clamping devices that exist for retaining wires and the like for many different applications. They include cushioned and uncushioned loop clamps, hose clamps and snapper type clamps, among others. The loop clamp is common in the aircraft and automotive industries, for both original equipment manufacturing as well as aftermarket sectors. These clamps are often used to attach pods and splitters to the airframe. The cushioned clamps are sometimes used to dampen vibration.

There are many disadvantages to the typical loop clamp. The clamps are difficult to install and therefore require more time and effort. The typical loop clamp is ergonomically undesirable in that repeated installation of the clamp results in carpal tunnel injuries for the operators. Also, many loop clamps are heavy and cannot be rotated or stacked when installed.

Most clamps require screws or bolts to keep the clamp locked. Others have two separate pieces that need to be locked at both ends with screws or bolts. Snapper type clamps require pliers for the installation. Thus, these all require tools for installation.

These clamps have a limited life in that repeated use may not be possible. The frequent removal and installation may cause fatigue on the clamp band and may lead to complete failure of the clamp. This is very undesirable especially in aircraft applications. In addition, such failures result in increased cost.

The ability to reuse clamps is desired for many reasons. However, traditional clamps may not be reused on engines, such as aircraft turbojets, because of the immense heat cycling and vibration. The metal fatigues and the cushion deforms. Other areas where traditional clamps may not be reused include pressure lines of hydraulic systems, aircraft engine pylons and wings.

Installing and removing wires, ducts and the like from traditional clamps can be cumbersome. Traditional loop clamp openings are not very wide and require a considerable amount of effort to be opened. Once opened, conventional loop clamps undergo metal fatigue and are subject to additional fatigue or failure when closed. In addition, the cushions that often are used with these clamps slip off or do not provide the amount of cushioning required, leading to greater abrasion and vibration.

Accordingly, it is desirable to provide a method and apparatus for a clamping assembly that is easy to install, ergonomically favorable, lockable, stackable, rotatable and lightweight. Moreover, it is desirable that the clamp be reused numerous times, in any type of application, without the likelihood of fatigue or failure, which also reduces cost.

SUMMARY OF THE INVENTION

The foregoing needs are met, to a great extent, by the present invention, wherein in one aspect an apparatus is provided that in some embodiments allows for easy installation, is ergonomically favorable, lockable, stackable, rotatable, lightweight, inexpensive and can be used repeatedly under any application.

In accordance with one embodiment of the present invention, a universal clamp apparatus includes two mating devices that engage at one end and pivotally connect at the other end to form a hinge.

In accordance with another embodiment of the present invention, a method of clamping wires together, or other materials, using the universal clamp device includes affixing the clamp around the wires and locking the clamp in place, without the use of tools.

In accordance with yet another embodiment of the present invention, a system for securing wires to an object includes securing the first ends of a top member and a bottom member together and pivotally connecting the second ends of the top member and the bottom member.

There has thus been outlined, rather broadly, certain embodiments of the invention in order that the detailed description may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
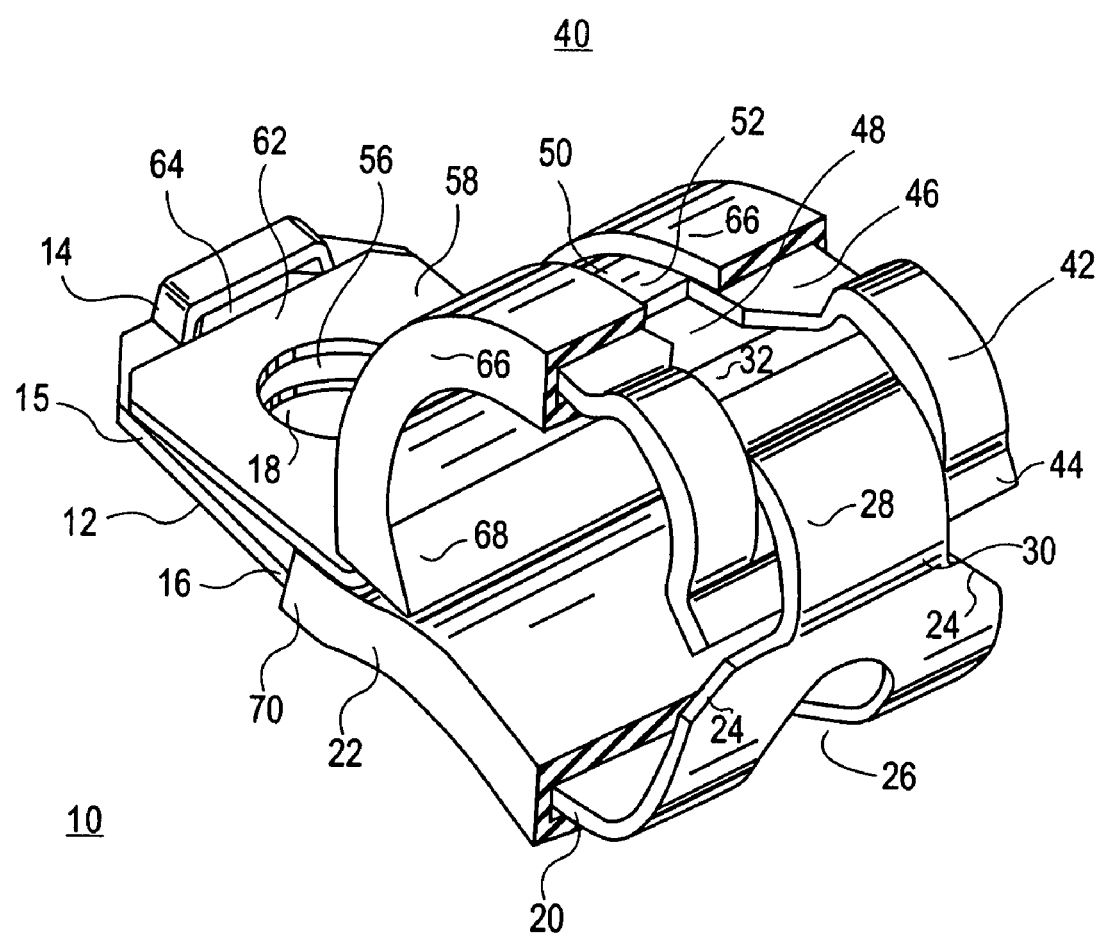
FIG. 1 is a perspective view of the clamp in a closed position according to a preferred embodiment of the present invention.

The invention will now be described with reference to the drawing figures, in which like reference numerals refer to like parts throughout. An embodiment in accordance with the present invention provides a universal clamp that allows for easy installation, is ergonomically favorable, lockable, stackable, rotatable, lightweight, inexpensive and can be used repeatedly.

FIG. 1 is an isometric view of the preferred embodiment of the present invention. This figure depicts the device having a bottom half clamp 10. The bottom half clamp 10 has a bottom planar surface 12, a first bottom end 12a, and a second bottom end 12b. The bottom planar surface 12 has an opening 14, configured to mate or accept another device at a first planar end 15, and a second planar end 16. Located on the bottom planar surface 12 are edges defining an opening or a bottom planar hole 18.

The bottom half clamp 10 has a first curved surface 20. The first curved surface 20 has a first curved end 22 that attaches to the second planar end 16 of the bottom planar surface 12. The first curved surface 20 also has an opposing second curved end 24 and a curved opening or hole 26. The second curved end 24 is adjacent to a second curved surface 28. The second curved end 24 includes a first end 30 and a flanged end 32.

The flanged end 32 of the second curved surface 28 has a width greater than that of the second curved surface 28. The flanged end 32, in the preferred embodiment, forms a T-shape object to the remaining portion of the second curved surface 28.

The bottom half clamp 10 mates with a top half clamp 40 to form the preferred embodiment of the present invention. The top half clamp 40 has a first curved surface 42 with a first top end 44 and a second top end 46. The first curved surface 42 has a top opening 48 to allow for insertion of the flanged end 32. The top half clamp 40 also has a second curved surface 50 with first end 52 that abuts the second top end 46 of the first curved surface 42.

The top half clamp 40 also contains a top planar surface 58. Located on the top planar surface 58 are edges defining an opening or a top planar hole 56. A top planar end 62 of the top planar surface 58 has an extension or protrusion 64 that mates with the opening 14 of the bottom half clamp 10.

The present invention also includes a housing 66 with a molded wedge 68 at one end, that prevents the cables or wires enclosed in the clamp from slipping out of the enclosure. Opposing the molded wedge 68 on the housing 66 is the other end 70 of the housing 66. The housing 66 may first be slid onto the bottom planar surface 12 and brought over the bottom half clamp 10 and the top half clamp 40 until the molded wedge 68 of the housing 66 is adjacent to the top planar surface 58. In the alternative, the housing 66 may first be slid onto the top planar surface 58 and brought over the top half clamp 40 and the bottom half clamp 10 until the housing 66 at end 70 is adjacent to the bottom planar surface 12.

Figure 2:
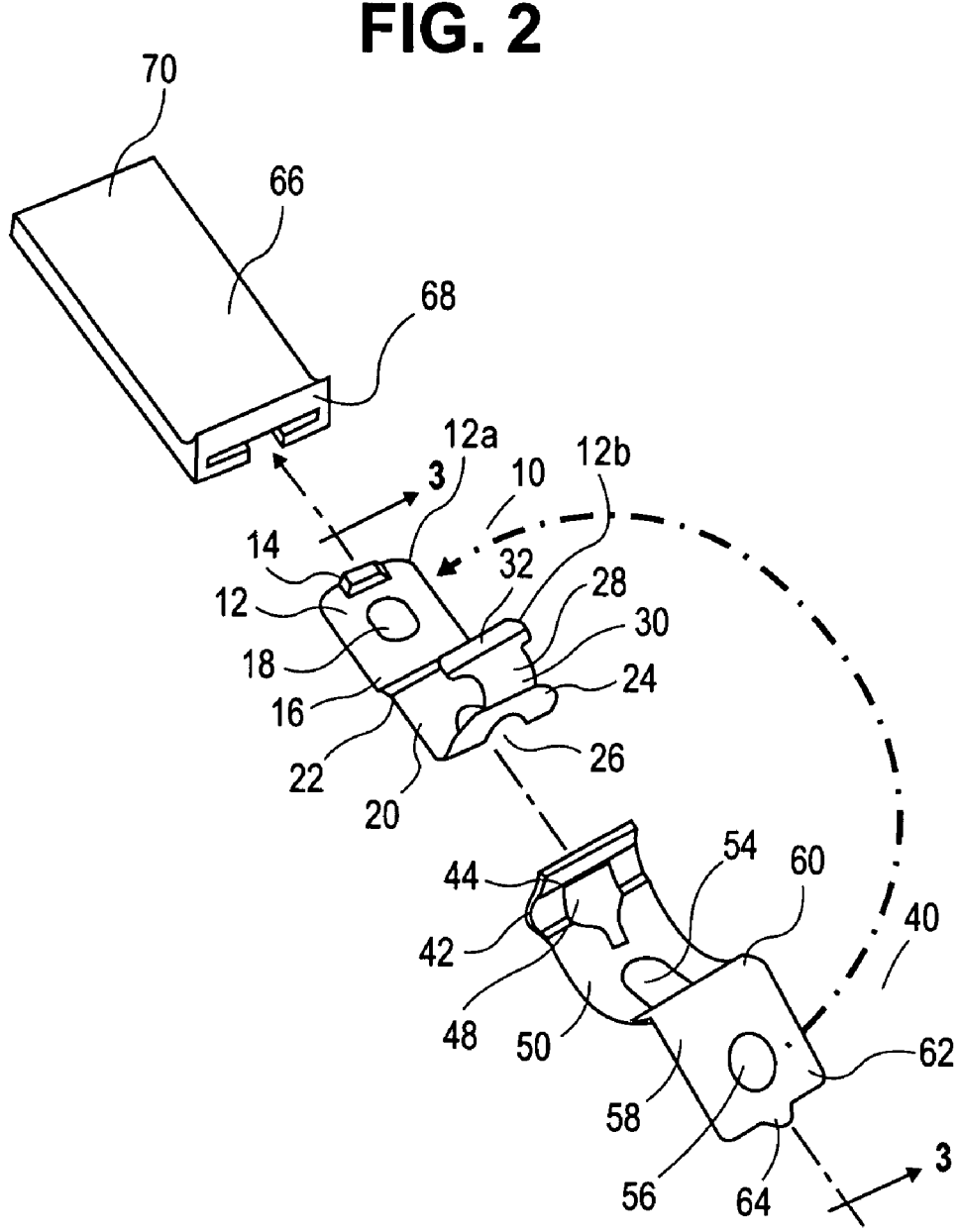
FIG. 2 is an isometric view illustrating the unassembled clamp according to the preferred embodiment of the invention.

FIG. 2 illustrates the preferred embodiment of the present invention, in an unassembled position. This figure illustrates the bottom half clamp 10 with the opening 14 at one end. The bottom half clamp 10 has a bottom planar surface 12 with the second planar end 16. Located on the bottom planar surface 12 are edges defining an opening or a bottom planar hole 18. The second planar end 16 is connected to the first curved surface 20, which has a first curved end 22 and a second curved end 24. The first curved surface contains an opening or hole 26. The second curved end 24, adjacent to a second curved surface 28, has one end 30 which attaches to the second curved end 24 of the first curved surface 20. The second curved surface 28 also has a flanged end 32 that mates with the top half clamp 40.

The top half clamp 40 has a first curved surface 42. The first curved surface 42 has a first top end 44. The first curved surface has a top opening 48 that accepts the flanged end 32 of the bottom half clamp. Adjacent to the first curved surface 42 is the second curved end 50. Located on the second curved surface 50 is an opening or hole 54. Adjacent the second curved surface 50 is the top planar surface 58. The top planar surface 58 has one end 60 and a top planar end 62 that contains a protrusion 64 that mates with the opening 14 of the bottom half clamp 10.

This figure also depicts an optional housing 66 with its molded wedge 68 at one end that prevents the cables or wires enclosed in the clamp from slipping out of the enclosure. Opposing the molded wedge 68 on the housing 66 is the other end 70 of the housing 66. The housing 66 is slid onto the bottom planar surface 12 and brought over the bottom half clamp 10 and the top half clamp 40 until the molded wedge 68 of the housing 66 is adjacent to the top planar surface 58. In the alternative, the housing 66 may first be slid onto the top planar surface 58 and brought over the top half clamp 40 and the bottom half clamp 10 until the housing 66 at end 70 is adjacent to the bottom planar surface 12.

Figure 3:
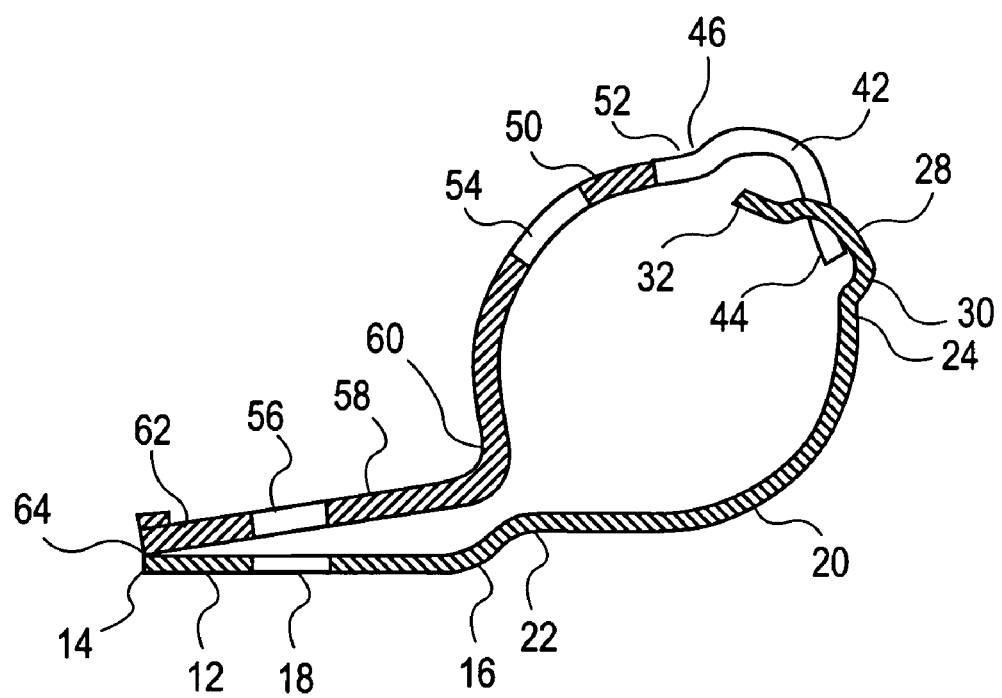
FIG. 3 is a side view of the mated clamp assembly of the preferred embodiment of the present invention.

FIG. 3 is a side view of the assembled clamp where the bottom half clamp 10 is pivotally attached to the top half clamp 40. The bottom half clamp has the bottom planar surface 12, with the opening 14 and the bottom planar hole 18. Second planar end 16 of the bottom planar surface abuts the first curved end 22 of the first curved surface 20. The first curved surface 20 has a second curved end 24 that attaches with end 30 of the second curved surface 28. Second curved surface 28 has a flanged end 32 that mates with the top half clamp 40.

Top half clamp 40 has a first curved surface 42 with a first top end 44. The first curved surface 42 has a second top end 46 that lies adjacent to end 52 of the second curved surface 50. Located on the second curved surface 50 is a hole 54. Second curved surface 50 has another end 60 that attaches to the top planar surface 58. The top planar surface 58 has a top planar hole 56 and a top planar end 62 with the protrusion 64 that mates with the opening 14 of the bottom half clamp 10.

The preferred embodiment of the present invention provides a device that includes a hinge, which allows for repeated use. This device is formed using two half clamps where the end of the first half clamp is slotted into the opening of the end of the second half of the clamp and subsequently enclosing the wires, or other suitable material. This aspect of the invention permits the clamp to be affixed around the wires or ducts and locked into place, without the use of any tools.

This universal clamp responds to a need for a cost effective, easy to install replacement to the standard series of clamps available today. This clamp is ergonomically efficient in that it can be installed with one hand without tools. This ability to install this clamp using just one hand greatly reduces the risk of injury and makes installation time efficient. The use of the hinge allows the clamp to be opened and locked in place repeatedly without metal fatigue or cushion deformation. Permissive use subsequently lowers the cost of replacement parts and the costs associated with installation of the replacement parts. The ability to reuse this device also prevents the metal bands from failing due to fatigue. This clamp can be used to replace standard loop clamps in any type of installation and application.

The universal loop clamp is designed to aid in the assembly of clamped components by holding itself closed and in place during installation. The clamp provides for installation of several clamps at one time at a single attachment point and is well suited for rapid clamp assembly and improved stacking methods for fluid lines, wire bundles, power feeder cables and fire detection lines. Easy installation not only increases productivity, it also allows for single-handed accessibility and easy clamping in hard-to-reach locations.

The bottom half clamp 10 and top half clamp 40 represent the two metal bands of the clamp. The present invention is configured to mate the two clamps whereby the flanged end 32 is inserted into the top opening 48 of the top half clamp 40 to form a hinge and then engage the protrusion 64 of the top half clamp 40, with the opening 14 of the bottom half clamp 10, to close the clamp and lock it in place. The hinge then allows the clamp to pivot open and closed repeatedly, which prevents the metal bands from undergoing metal fatigue and later, failure.

Once the two half clamps are mated to form the clamping assembly, the cushion housing 66 may be attached to the clamp. The clamp locks easily, whereby the protrusion 64 of the top half clamp is engaged with the opening 14 of the bottom half clamp. This engagement can be done easily, with one hand and requires no tools of any kind. The time required for locking the clamp is minimal.

Unlocking the clamp is just as easy and quick. Pushing the top half clamp 40 inward away from the opening 14 quickly releases the top half clamp 40 from the bottom half clamp 10. Also, wires, ducts or the like are easily removed from the clamp since the top half clamp opens widely without metal fatigue.

Upon locking, the top planar hole 56 of the top half clamp 40 is aligned with the bottom planar hole 18 of the bottom half clamp 10. It is through the top planar hole 56 and the bottom planar hole 18, that a fastening device such as a screw, attaches the clamp to another object such as an air frame. In this manner, several clamps can be used at once and stacked on top of each other by fastening the holes of the individual clamps together. These universal clamps can also be rotated about the fastening means by turning the clamp.

In a preferred embodiment, the present invention also incorporates a difference in the thickness between the top planar surface 58 of the top half clamp 40 and the bottom planar surface 12 of the bottom half clamp 10. In particular, the top planar surface 58 is thicker than the bottom planar surface 12. The difference in thickness provides for the top planar surface to be flush with the locking mechanism, allowing the clamps to be stackable. This difference in thickness also allows for multiple pay loads to be mounted at one location.

The slot 26 of the bottom half clamp 10 and the slot 54 of the top half clamp 40 provide yet another benefit. These slots allow the clamp to be light yet still perform well. The cumulative effect of using numerous lighter clamps in aircraft or automotive applications lowers the weight considerably, resulting in lower total installed weight. This results in lower cost, as well as greater maneuverability. Thus, the universal clamp results in cost savings in that it is lightweight, requires no tools for installation, reduces the occurrence of injuries, can be used repeatedly, and does not experience metal fatigue or failure.

Another embodiment of this invention includes inserting flanged end 32 of the bottom half clamp 10 into the top opening 48 of the top half clamp 40 and bringing the top half clamp around whereby the top planar surface 58 of the top half clamp 40 rests approximately parallel to the bottom planar surface 12 of the bottom half clamp 10. This embodiment also includes inserting the protrusion 64 of the top half clamp 40 into the opening 14 of the bottom half clamp 10, locking the universal clamp.

Another embodiment of this invention may include the further step of affixing the universal clamp to another object such as an air frame by way of inserting a fastening means such as a screw through the top planar hole 56 of the top planar surface 58, resting atop the bottom planar hole 18 of the bottom planar surface 12. Yet another embodiment of the invention includes a system for fastening wires or ducts to another object, such as an air frame, whereby a top member mates with a bottom member at one end and a protrusion of the top member engages with an opening of the bottom member at the other end.

Figure 4:
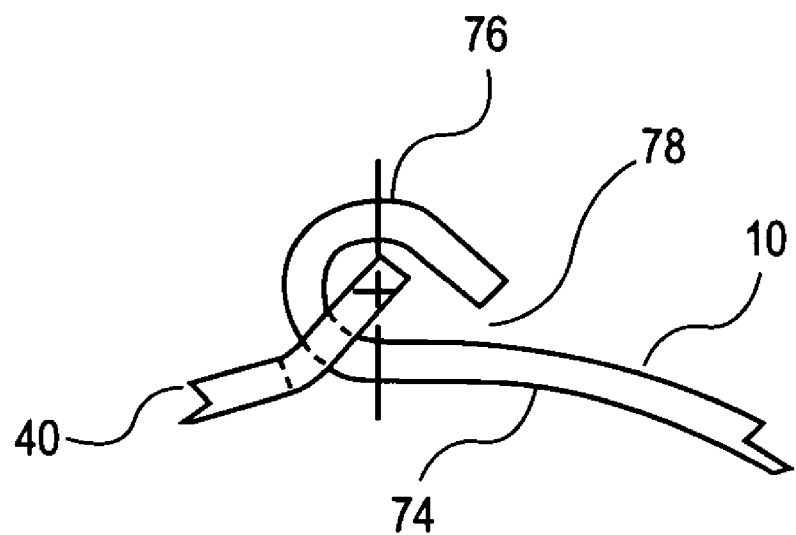
FIG. 4 is a side view of the mated clamp assembly at the pivot point between the top and bottom clamp members according to an alternate embodiment of the present invention.

FIG. 4 is a side view of the mated clamp assembly at the pivot point between the top and bottom clamp members according to an alternate embodiment of the present invention. This figure discloses that that the bottom half clamp 10 is looped or curved at one end 74 such that it can be mated with the top half clamp 40. The looped section 76 is configured such that the top half clamp 40 is freely permitted to move about. The free movement of the looped section 76 enables the clamp to be opened and closed substantially free of interference at the pivot point.

Referring to FIG. 4, the top half clamp 40 includes an opening (not shown) that enables the looped section 76 of the bottom half clamp 10 to pass through it. Once the looped section 76 passes through the opening, the bottom half clamp 10 and the top half clamp are pivotally mated.

It is noted that in this alternate embodiment the looped section 76 is curved back towards bottom half clamp 10 such that an entry point 78 is created. It is through this entry point 78 that the top half clamp 40 is permitted to enter and engage the bottom half clamp 10 through the opening (not shown). The spacing, which is created between the looped section 70 and the bottom half clamp 10, creates the entry point 78 is limited such that enables the top half clamp 40 through to engage the bottom half clamp 10 as well as prevent the top half clamp 40 from disengage from the bottom half clamp 10.

In this alternate embodiment, it is within the scope of this invention that the bottom half clamp and the top half clamp can be used interchangeable. For example, the top half clamp 40 can contain the looped section 76.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A clamping apparatus, comprising:
    a top member comprising a first top end and a second top end, wherein the first top end comprises a protrusion extending therefrom and the second top end comprises an opening;
    a bottom member comprising a first curved end, a second curved end, a first bottom end and a second bottom end, the second bottom end is configured to be detachably mated to the second top end and the first bottom end is releasably attached to a top planar end of the top member, wherein the bottom member further comprises:
        a slot located at the first bottom end, wherein the slot is configured to be mated with the protrusion; and a flanged end extending from the second bottom end that is adapted to mate with the opening of the second top end, and a housing adapted to receive both the first top end of the top member and the first bottom end of the bottom member.

2. The clamping apparatus as in claim 1, wherein the top member further comprises a top curved surface extending from the first top end and the bottom member further comprises a bottom planar surface extending from the first bottom end.

3. The clamping apparatus as in claim 2, wherein the top planar surface further comprises a top hole.

4. The clamping apparatus of claim 2, wherein the bottom planar surface further comprises a bottom hole.

5. The clamping apparatus of claim 2, wherein the top planar surface further comprises a top hole and the bottom planar surface further comprises a bottom hole.

6. The clamping apparatus of claim 5, wherein the top hole and the bottom hole are approximately axially aligned upon the protrusion engaging the slot.

7. The clamping apparatus of claim 2, wherein the top planar surface abuts the bottom planar surface upon the mating of the first top end with the first bottom end.

8. The clamping apparatus of claim 2, wherein the top planar surface has a different thickness than the bottom planar surface.

9. The clamping apparatus of claim 8, wherein the top planar surface has a thickness greater than the thickness of the bottom planar surface.

10. The clamping apparatus of claim 1, further comprising the top member having a thickness different from the bottom member thickness.

11. The clamping apparatus of claim 10, wherein the top member has a thickness greater than the bottom member thickness.

12. The clamping apparatus of claim 1, wherein the second top end further comprises a top curved end.

13. The clamping apparatus of claim 1, wherein the second bottom end further comprises a bottom curved end.

14. The clamping apparatus of claim 1, wherein the second top end comprises a top curved surface and the second bottom end comprises a bottom curved surface.

15. The clamping apparatus of claim 14, wherein the top curved surface comprises a top curved opening and the bottom curved surface comprises a bottom curved opening.

* * * * *